United States Patent Office 3,073,466
Patented Jan. 15, 1963

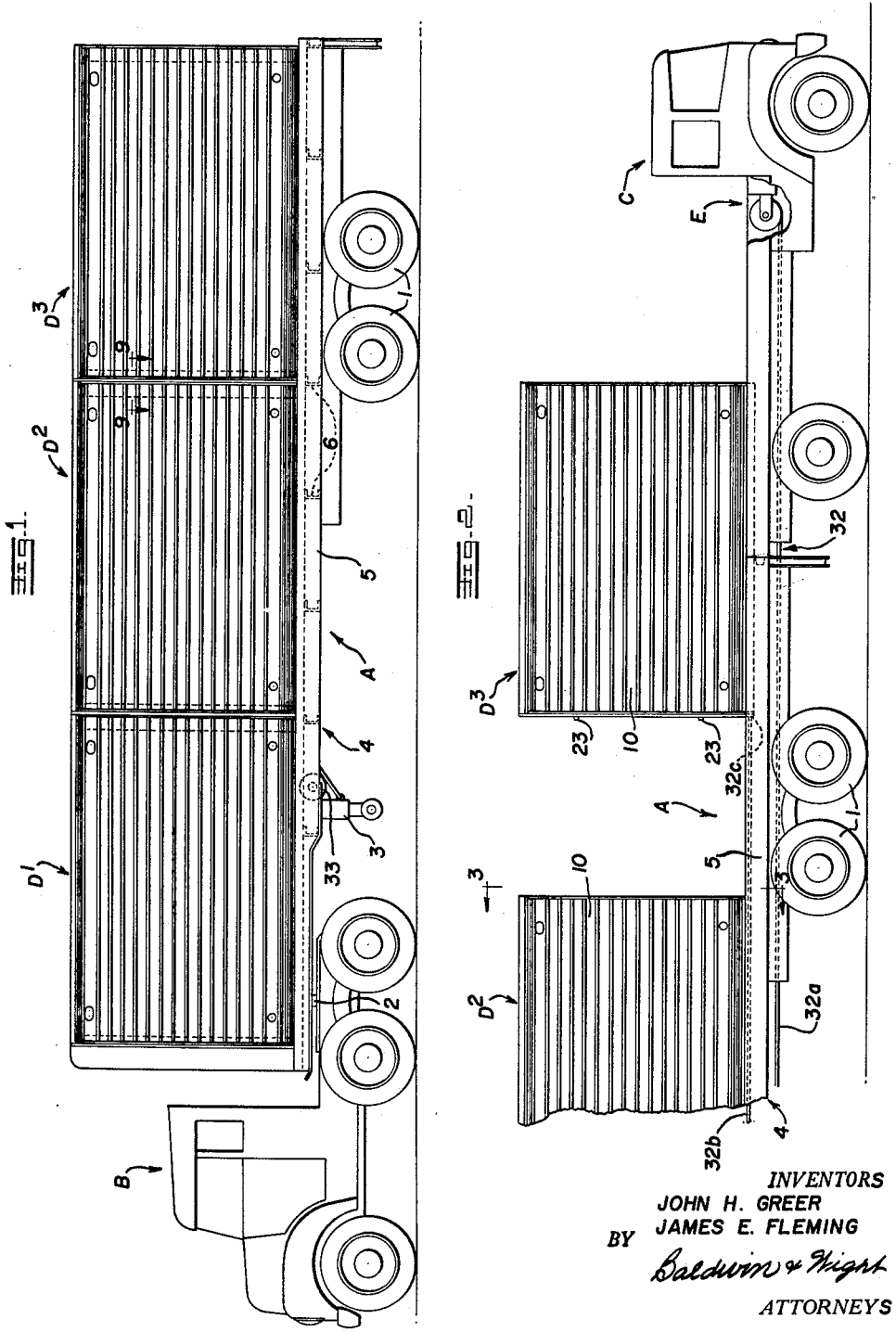

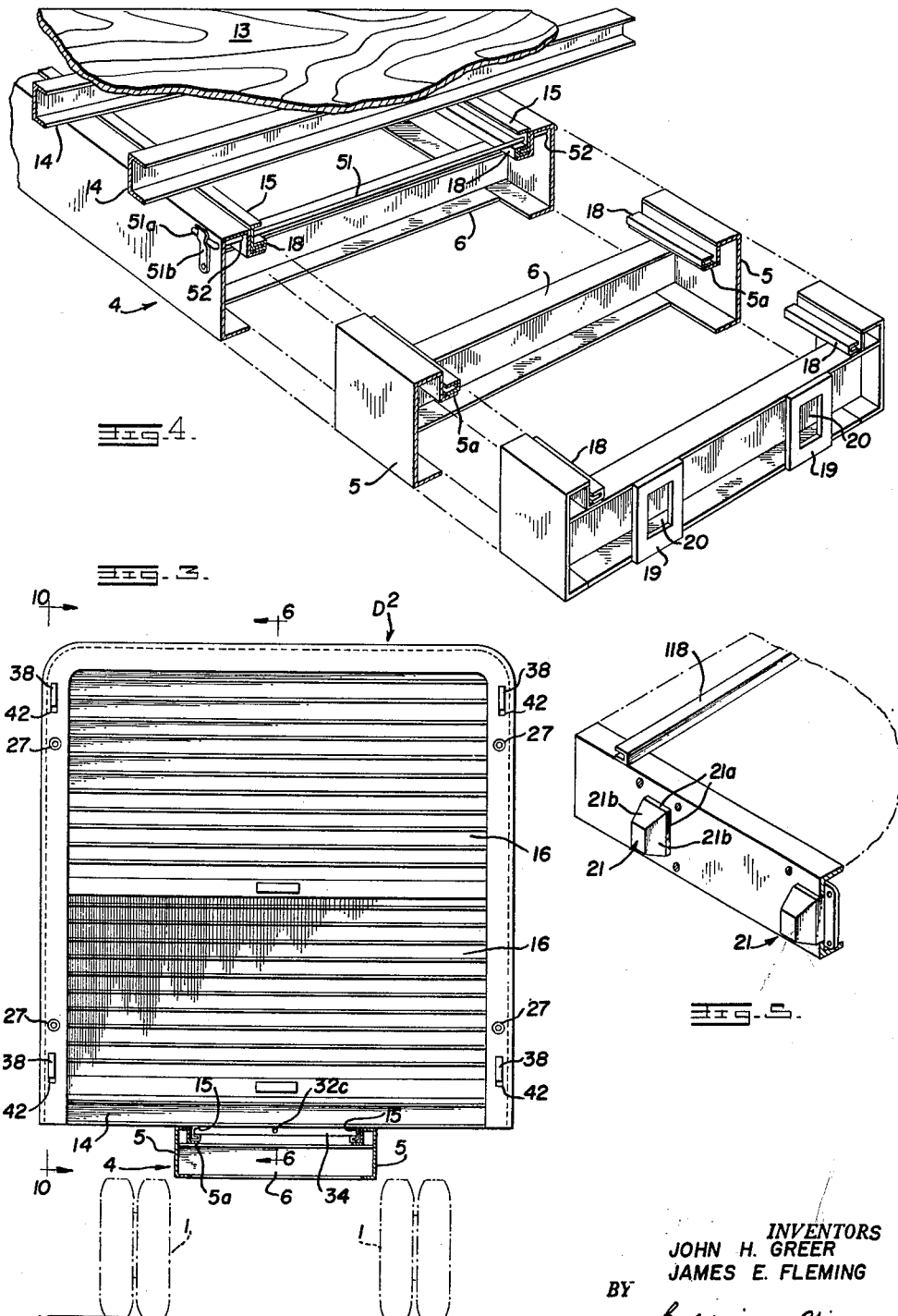

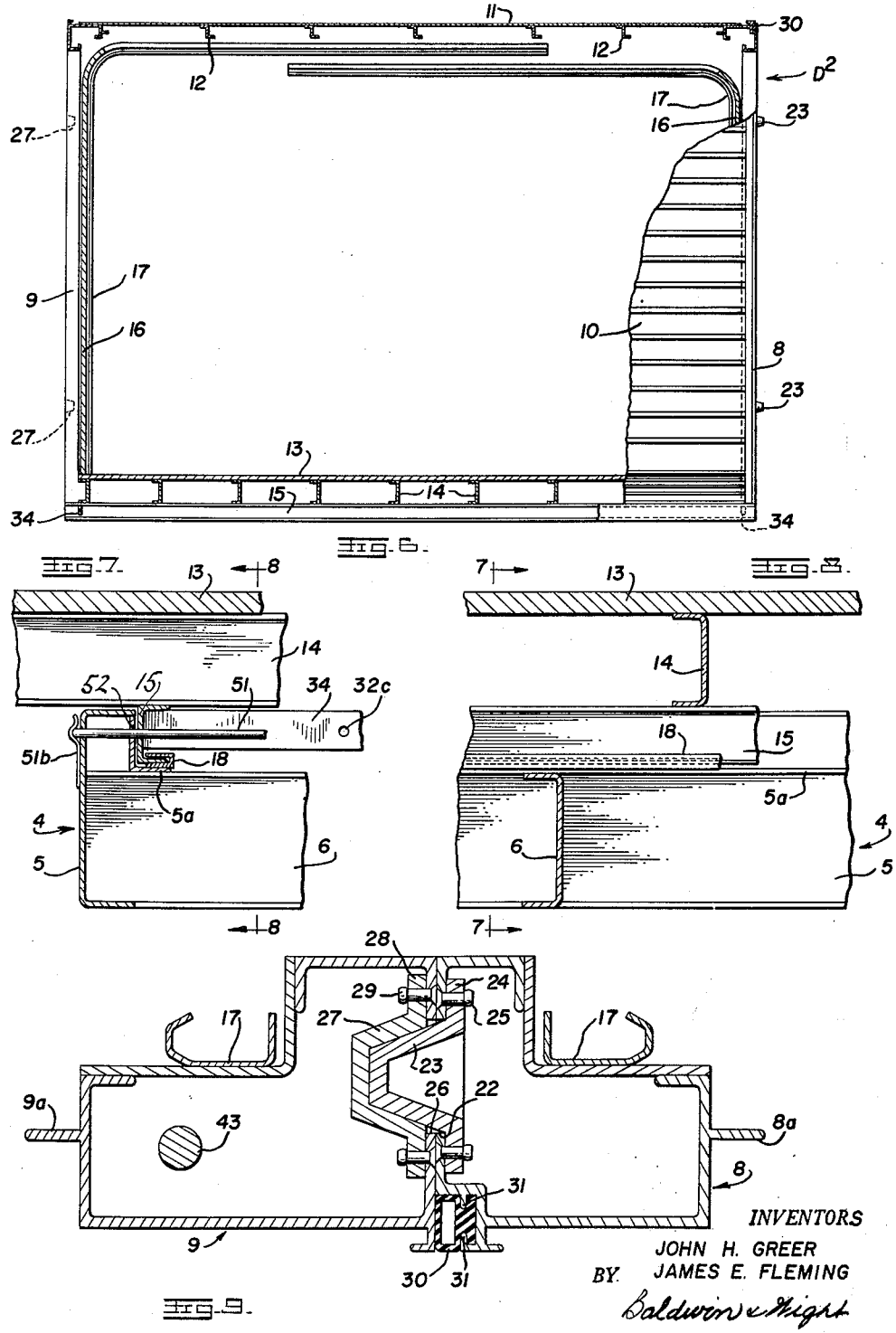

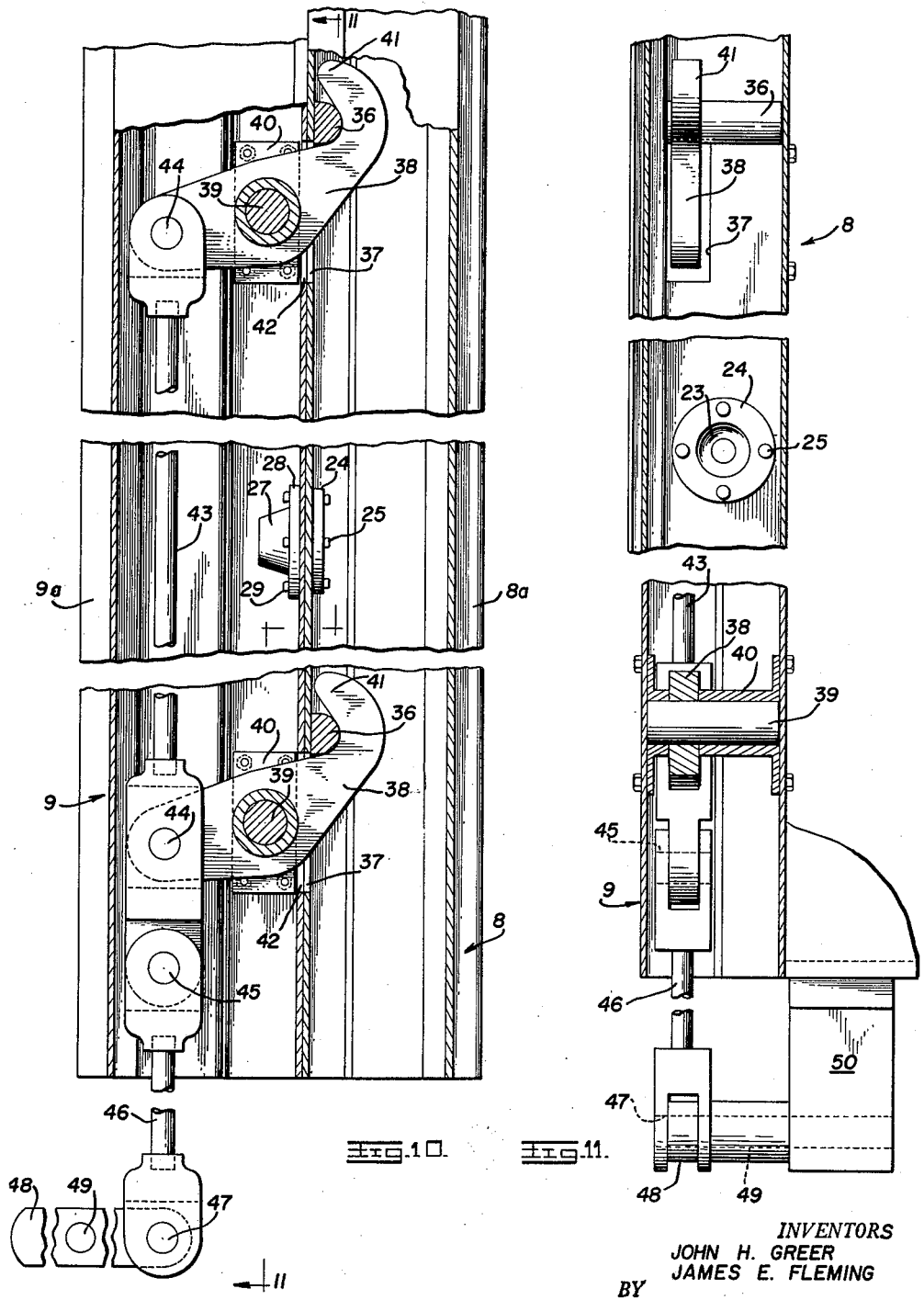

3,073,466
TRANSPORTATION UNIT CARRYING, LOADING, AND UNLOADING EQUIPMENT
John H. Greer, 100 Elizabeth Ave., Bowling Green, Ky., and James E. Fleming, Brookhaven Drive, Russellville, Ky.
Filed June 29, 1959, Ser. No. 823,563
2 Claims. (Cl. 214—515)

This invention relates to transportation unit carrying, loading and unloading equipment, and more particularly to equipment of this general class especially useful and efficient in handling unit cargo carriers, such as individual cargo containers which may be pre-loaded at one point, then carried to a main dispatching or shipping point, and there transferred with other such units to a mobile load receiving unit, e.g. a truck or tractor drawn trailer.

An object of the invention is to provide equipment of this kind including improved means for supporting such cargo units and for enabling ready transference thereof from one load receiving structure to another.

A further object of the invention is to provide equipment of the character stated in which a plurality of individual cargo carrying units in end-to-end alignment on a single load receiving structure may be converted, so to speak, into a unitary cargo carrying and enclosing structure defining a loading or cargo receiving space extending continuously throughout a plurality of adjacent and aligned units.

A further object of the invention is to provide equipment generally as described above including means for securely locking together a plurality of individual cargo carrying units so that they will form a rigid structure, in itself having substantial resistance to vertical transverse deflection, whereby the associated underlying load receiving structure may be built more lightly and thus more economically.

Other objects of the invention will become apparent from a reading of the following description of a preferred embodiment, the appended claims, and the accompanying drawings, in which:

FIGURE 1 is a side elevational view of a tractor-trailer load receiving, supporting and transporting structure with three load carrying units positioned on the trailer bed;

FIGURE 2 is a fragmentary side elevational view of the rear portion of the trailer shown in FIGURE 1 in end-to-end abutting relation to and parallel alignment with a pickup truck, one load carrying unit being shown in a transient position occupied during transference from the pickup truck to the trailer;

FIGURE 3 is a vertical section on the line 3—3 of FIGURE 2, a load carrying unit end closure being shown in partially open position;

FIGURE 4 is a fragmentary perspective view showing portions of a load carrying support, e.g., a trailer bed, and a portion of the floor and underlying cross members of a load carrying unit supported on the trailer bed;

FIGURE 5 is a fragmentary perspective view showing projections carried by a load receiving structure, such as a pickup truck, adapted for entry into cooperating guide openings on a trailer bed for effecting accurate alignment of the two load receiving structures, i.e., the trailer bed and the bed of the pickup truck or other load receiving support;

FIGURE 6 is a longitudinal vertical section on the line 6—6 of FIGURE 3 showing only the load or cargo carrying unit structure;

FIGURE 7 is a fragmentary vertical section transverse to the trailer bed and cargo unit, illustrating details of interengaging supporting and guiding members respectively on the trailer bed and cargo unit supported thereon, the section being on the line 7—7 of FIGURE 8;

FIGURE 8 is a fragmentary vertical section longitudinal of the trailer bed and on the line 8—8 of FIGURE 7;

FIGURE 9 is a detailed horizontal section on the line 9—9 of FIGURE 1 drawn on an enlarged scale and showing the frame parts of two adjacent cargo carrying units with interengaging guiding or registering means and means for sealing the joint between the two units;

FIGURE 10 is a fragmentary vertical section on the line 10—10 of FIGURE 3, drawn on an enlarged scale and illustrating mechanism for locking two adjacent cargo carrying units tightly together in end-to-end connected relation; and FIGURE 11 is a vertical section on the line 11—11 of FIGURE 10.

The invention may be embodied in transportation unit loading, carrying and unloading equipment including a movable load receiving structure, a second load receiving structure and means on the two load receiving structures adapted to support a load carrying unit or units on one of the load receiving structures in a manner to enable easy transference of a load carrying unit from one load receiving structure to the other when the two structures are in end-to-end registering alignment. For example and as shown in the drawings, the equipment may include a tractor-trailer load receiving structure adapted to carry one or more cargo units and a pickup truck which is so constructed that when backed up into end-to-end registering alignment with the trailer bed, cargo units may be transferred horizontally from the truck to the trailer and vice-versa.

The trailer A, tractor B and pickup truck C shown in FIGURES 1 and 2 may be basically of conventional design except with respect to structure and equipment especially provided for achieving the objects of the invention. The trailer includes the usual ground wheels 1 and a support 2 for mounting the front end of the trailer on the tractor truck B. A landing gear 3 is provided for supporting the forward end of the trailer when disconnected from the truck B. The trailer bed, generally designated 4, is constituted by two spaced longitudinally extending sills 5 and connecting cross members 6. In one mode of carrying out the invention, the sills 5 are of modified channel shaped cross section having vertically extending webs and having their upper flanges extended downwardly and turned inwardly toward the center of the bed 4 to provide horizontal flanges $5^a$ as shown in FIGURES 4, 7 and 8. The sills 5 and cross members 6, which may also be of channel shaped cross section, are secured together in any suitable manner as by welding to provide a substantially rigid trailer bed. For reasons hereinafter to be pointed out, the trailer bed may be constructed more lightly than prior art trailer beds of generally the same compass. At this point, suffice it to say that in accordance with the present invention, the load carrying units to be supported on the load receiving trailer bed are equipped to be secured together in end-to-end abutting relation so as to provide a load carrying structure which in itself has substantial rigidity and resistance to deflection. Such an independently rigid structure substantially reduces the load carrying and deflection resisting capacity required for the trailer bed, and thus enables the bed to be constructed more lightly than trailer parts used in the prior art, with resultant economy.

Three cargo carrying units $D^1$, $D^2$ and $D^3$ are shown in FIGURE 1 supported on the trailer bed 5 in end-to-end abutting relation. These units are of similar construction so that a description of the unit $D^2$ will suffice for a description of all. At opposite ends of the unit $D^2$ are generally inverted U-shaped end framing members 8 and 9 of box-like cross section as shown in FIGURE 9.

The framing parts 8 and 9 are formed respectively with flanges 8ª and 9ª extending generally in the planes of the sides of the unit $D^2$ to provide for the mounting of siding 10 which may be constituted of corrugated or sheet metal. The unit $D^2$ has a roof 11 which also may be of sheet metal carried by the horizontal portions or bights of the inverted U-shaped members 8 and 9, stiffening bars 12 of substantially Z cross section being secured to the bottom of the roof 11. The unit $D^2$ further includes a ply-wood floor 13 stiffened by cross channels 14 to the bottom flanges of which are secured two spaced longitudinally extending channels 15. Alternatively, the floor may be formed of sufficiently stiff material, e.g. extruded aluminum, in which case the cross members 14 may be eliminated. The unit $D^2$ is open at each of its ends and is equipped with roller doors 16 of any suitable construction mounted to roll or glide in tracks 17 in accordance with any suitable or known roller door construction, it being sufficient that the tracks 17 mount the closures on doors 16 for movements from the closed position shown at the left in FIGURE 6 to an overhead open position.

In use, the units $D^1$, $D^2$ and $D^3$ may be supported on the trailer bed 4, as illustrated generally in FIGURE 1, and may be secured together by locking means later to be described so as to provide in effect a unitary load carrying structure possessed of substantial rigidity and resistance to deflection under load. When the units $D^1$, $D^2$ and $D^3$ are so positioned, the roller doors at the ends of adjacent units may be opened so as to provide a single load carrying space extending continuously substantially throughout the whole assembly of units.

In one typical use of equipment embodying the invention, a tractor-trailer assembly may be parked, unloaded, at a central loading point, and individual load carrying units such as the units $D^1$, $D^2$ and $D^3$ may be brought to the parking position individually on pickup and delivery trucks exemplified by the truck C. A truck C is maneuvered into end-to-end registration and longitudinal alignment with the trailer A, as shown in FIGURE 2, and the cargo carrying unit, as shown in the unit $D^3$, is then moved horizontally from the truck C onto the trailer bed 4. FIGURE 2 shows the cargo carrying unit $D^2$ as having previously been positioned on the trailer bed 4, and shows the unit $D^3$ in a transient position during transference from the truck C to the trailer A.

An improved structure is provided for supporting the units $D^1$, $D^2$ and $D^3$ on the trailer and truck for enabling transference from the trailer to the truck and vice-versa. In the illustrative construction, a channel shaped guide member 18 is welded or otherwise secured to the lower flange 5ª of each of the trailer sills 5 with the openings in the channel members 18 facing outwardly toward the sides of the trailer bed. The channel members 18 provide guides for receiving the inwardly extending lower flanges of the longitudinal channels 15 secured to the bottom of the cargo carrying units. The construction is such that the pair of relatively stationary guide channels 18 carried by the trailer bed cooperate with the pair of relatively movable guide channels 15 carried by the cargo units for supporting the latter on the trailer bed and guiding the units for endwise movement on the bed and thus for transference from the trailer to the pickup truck or other load receiving structure. As shown in FIGURE 5, the body or bed of the pickup truck is provided with load supporting and guiding channels 118 similar to the channels 18 and adapted to be brought into end-to-end registration with the latter for enabling a cargo unit to be slid from one load receiving structure to the other. Since the channels 18 have flanges extending respectively below and above the lower flanges of the channels 15, the interengaging guide parts prevent tipping of the cargo unit as well as supporting and guiding the unit for transference.

Bringing the two load receiving structures into the proper end-to-end alignment and registration of their guide means is facilitated by guide registration devices mounted on the ends of the two load receiving structures. In the form shown, the rear end of the trailer bed 4 is fitted with two spaced plates 19 formed respectively with rectangular openings 20 adapted to receive similarly spaced projections 21 mounted on the rear of the pickup truck. In the preferred construction the projections 21 are of modified frusto-pyramidal form, including a base part defined by four sides 21ª extending longitudinally of the axis of the pyramid and four tapered sides 21ᵇ extending outwardly from the base part. The tapered portions of the projections defined by the sides 21ᵇ facilitate entry of the projections 21 into the openings 20 on the trailer bed; and the base parts of the projections 21, being non-tapered, have no tendency to effect longitudinal separation of the trailer and truck as might otherwise be caused by the camming effect of lateral pressure exerted by a tapered projection against the wall of the surrounding opening.

The guide channel members 18 on the trailer bed and the interfitting guide channel members 15 on the cargo units cooperate to effect substantial alignment and relation of the cargo units when, for example, being transferred from several pickup trucks to the bed of the trailer A. However, a fair amount of clearance between the guide channel members 15 and 18 may advantageously be provided to enable ready entry of the lower flanges of the guide channel members 15 into the guideways provided by the channel members 18. Consequently, the members 20 and 21 cannot always provide perfect alignment and registration of a plurality of cargo units transferred to the trailer bed. In accordance with the invention, supplemental guiding means are provided for finally aligning and effecting accurate registration of the cargo carrying units with each other when they have been transferred to the trailer A and are in end-to-end abutting relation. As shown in FIGURES 2, 3, 6 and particularly FIGURE 9, the frame section 8 at one end of each cargo carrying unit, for example, the unit $D^3$, is provided adjacent each side of the unit and adjacent the top and bottom thereof with an opening 22 through which extends a frusto-conical aligning projection 23 having a base flange 24 secured within the section 8 by rivets 25, the frusto-conical projection 23 extending outwardly from the unit $D^3$ toward an adjoining unit, for example, the unit $D^2$. The frame section 9 of the adjoining unit $D^2$ is formed adjacent each side and adjacent both the top and bottom with an opening 26 positioned so as freely to receive or permit entry of the aligned projection 23 on the unit $D^3$. A frusto-conical seat member 27 is secured to the frame section 9, the member 27 having a base flange 28 riveted at 29 to the frame section 9. The cooperative arrangement and the degree of tapering of the projection 23 and seat member 27 are such that when the two units $D^2$ and $D^3$ are moved relatively toward one another in substantial alignment, the four projections 23 will enter the four seat members 27 even though the units be not perfectly aligned, whereupon further relative approaching movements of the units $D^2$ and $D^3$ will, through the cooperation of the projections 23 and the seats 27, nudge the two units into accurate alignment.

As has been pointed out above, there will be occasions when it will be desirable to open the roller doors between adjoining cargo carrying units so as to provide a single cargo carrying space extending continuously throughout the units. Under such conditions it is important that the joint between any two adjacent cargo carrying units having their doors in such open positions be sealed tightly against the weather. As shown in FIGURE 9 this is accomplished by the provision of a resilient sealing strip 30, for example, of natural or synthetic rubber or other suitable flexible material carried by the frame section 8 and adapted normally to project slightly beyond the transverse or end face of the section 8. The strip 30 may be anchored to the frame section 8 in any suitable manner, for example, by having an anchor or base portion spread out under opposed ribs 31, formed in the section 8. When the two adjacent cargo carrying units, and hence their sections 8 and 9, are brought together in end-to-end contact, the normally outwardly projecting sealing strip 30 engages the section 9 and is compressed between the two sections 8 and 9 so as to provide the desired seal.

While the cargo carrying units may be moved or transferred from one load receiving structure to the other by various means, the present invention additionally provides unit transferring equipment operable by power supplied by mechanism on one of the load receiving structures itself. In the preferred embodiment, a windlass E is mounted on the pickup truck C just behind the truck cab and below the top of the truck chassis or bed. For moving a cargo carrying unit, for example, the unit $D^3$, from the truck C to the trailer A, a cable generally designated 32 is led from the windlass underneath the truck and trailer beds, as indicated at $32^a$, thence around a sheave or pulley 33 on the trailer and thence in a reverse direction as indicated at $32^b$ above the cross frame members of the trailer and truck, the free end of the cable being connected at $32^c$ to a transversely extending draw bar 34 secured to the bottom of the unit $D^3$. By driving the winch E, for example, through a power take-off mechanism operated by the truck engine, the cable will be wound in so as to pull the unit $D^3$ to the left as viewed in FIGURE 2 and transfer the unit from the truck C to the trailer A. In order to tranfer a unit from the trailer A to the truck C, the cable 32 is extended directly from the windlass over the cross members of the truck and trailer frames and is hooked to the cargo unit draw bar 34, of course, without being trained around the pulley 33. Winding in of the cable by the winch E will then transfer the unit $D^3$ from the trailer A to the truck C.

As previously stated, one of the advantages of construction embodying the invention is that the cargo carrying units once loaded upon the mobile load receiving structure, as shown, the trailer A, may be secured together so as to provide a composite load carrying structure, in itself possessed of rigidity and resistance to deflection. In the illustrative embodiment, releasably interengaging locking or clamping means, as shown in detail in FIGURES 10 and 11, is provided on each of the cargo units. The frame part 8 of each unit is equipped on each side and at both top and bottom with a bar 36 adjacent each of which is an opening 37 formed in the section 8. The frame part 9 of each cargo unit is provided on each side and both at top and bottom with a clamping lever 38 pivoted on a pintle 39 supported by a spool-like structure 40 secured to the frame member 9. Each lever 38 has a cam or hook-like nose 41 which projects through an opening 42 in the frame section 9 and which is adapted to project through an aligned opening 37 in the frame section 8 of the adjoining cargo carrier unit when the units are brought into end-to-end abutting relation. Normally, the clamping levers 38 are rocked clockwise from the positions shown in FIGURE 10 so as to extend more or less horizontally and enable passage of the clamping lever noses 41 through the openings 37 of the adjoining section 8. After the cargo units have been moved into abutting relation, the levers 38 are rocked counterclockwise to bring the lever noses 41 into clamping engagement with the bars 36, thus drawing and locking the two cargo units firmly together in end-to-end abutting relation. When the two adjacent cargo units are thus clamped together, their interfitting aligning projections 23 and recessed seat members 27 will cooperate both to effect accurate lateral positioning of the units and, in combination with the damping means 36, 38, to effect secure locking of the units in a continuously extending, stress carrying structure. This structure, having self-contained beam characteristics, makes it permissible to carry heavier loads on relatively lightly and inexpensively constructed trailer beds than otherwise would be possible.

In order that the clamping levers 38 on each side of the associated cargo unit may be operated simultaneously, a connecting link 43 is pivoted at 44 to each of the levers 38 and is pivoted at 45 to a lower link 46 which in turn is pivoted at 47 to an operating handle or arm 48 mounted to rock at 49 on a bracket 50 depending from the cargo unit. Operation of the handle or arm 48 will effect conjoint rocking of both clamping levers 38 on the same side of the unit through the common operating linkage 43, 46, 48.

Any suitable means may be provided for holding the cargo units against shifting longitudinally on the load receiving and supporting structures. A simple arrangement includes locking bars 51, one of which is shown in FIGURES 4 and 7 as extending through aligned openings 52 in the cargo unit guide channel members 15 and the trailer bed sills 5. As many openings 52 and bars 51 as are required by the desired positioning of the cargo units may be provided. Each bar has a handle $51^a$ which may be held releasably by a spring clamp or retainer $51^b$.

*Operation*

Although the construction and cooperation of the parts and various manners of using the equipment will be apparent from the foregoing description, a resume of a typical operation or use of the equipment may be helpful in understanding the nature of the invention in its broader sense and apart from specific details. Assuming, for example, that cargo carrying units $D^1$ and $D^2$ have been placed upon the trailer A in the positions shown in FIGURE 1 and that it is desired to transfer a third unit—$D^3$—from a newly arrived pickup truck C, the latter is backed up to the rear end of the trailer A as indicated in FIGURE 2. Entry of the aligning projections 21 on the truck C into the aligning openings 20 on the trailer will nudge the truck and trailer beds into alignment as will be permitted by the spring suspensions of the truck and trailer. This aligning of the truck and trailer bed structures will effect sufficiently accurate alignment of the guideways to enable the guide members 15 at the bottom of the unit $D^3$ to slide into the guide channels 18 on the trailer bed upon pulling the unit $D^3$ toward the left, as viewed in FIGURE 2, by means of the windlass E and cable 32. When the unit $D^3$ is moved against the unit $D^2$, the frusto-conical aligning projections and seats 23 and 27 will bring about accurate alignment of the units $D^2$ and $D^3$. Finally, the adjoining units are secured and locked together by rocking the cam levers 38 counterclockwise to the positions shown in FIGURE 10.

The construction shown embodies the invention in a preferred form, but the disclosure is intended to be illustrative rather than definitive, the invention being defined in the claims.

We claim:

1. In a truck bed construction, including a normally substantially horizontally oriented frame bed, the improvement which comprises a pair of unitary, rigid guide members extending substantially parallel to the fore and aft axis of movement of the truck bed, said guide members fixedly mounted in parallel orientation on said truck bed and spaced laterally of one another, each of said guide members so formed as to substantially enclose a slideway defined thereby, said members 6-shaped in transverse cross section and positioned with the lower loops thereof facing one another, a plurality of load receiving units each so constructed as to be able to at least substantially enclose a three dimensional volume therewithin, a pair of guides engageable only in a fore-to-aft sliding motion with the truck bed guides fixed to the underside of each of said load receiving units, said unit guides C-shaped in transverse cross section and so positioned with the C opening facing one another, the bed and unit guides so engaged with one another as to permit only said sliding motion between said bed and units, removable means for releasably securing the load receiving unit guides within the truck bed guides against fore and aft sliding motion rigidly connecting said 6-shaped members and C-shaped guides, and means cooperating between abutting ends of the volume units to releasably fix them relative to one another.

2. A construction as in claim 1 including a sealing member cooperating between the abutting ends of the load carrying units whereby to form a seal therebetween.

References Cited in the file of this patent

UNITED STATES PATENTS

| | | |
|---|---|---|
| 885,162 | Kirchner | Apr. 21, 1908 |
| 1,237,834 | Stamper | Aug. 21, 1917 |
| 1,270,086 | Wochner | June 18, 1918 |
| 1,451,127 | Thornton | Apr. 10, 1923 |
| 1,611,882 | Budd | Dec. 28, 1926 |
| 1,799,233 | Holan | Apr. 7, 1931 |
| 1,835,133 | Bergen | Dec. 8, 1931 |
| 2,223,275 | Valenzuela | Nov. 26, 1940 |
| 2,631,885 | Ault | Mar. 17, 1953 |
| 2,699,735 | Williams | Jan. 18, 1955 |
| 2,761,581 | Cohee | Sept. 4, 1956 |
| 2,820,642 | Harper | Jan. 21, 1958 |
| 2,849,129 | Likens | Aug. 26, 1958 |
| 2,856,085 | Ryan | Oct. 14, 1958 |
| 2,899,237 | Nash | Aug. 11, 1959 |